(12) United States Patent
Sallot (10) Patent No.: US 12,083,589 B2
(45) Date of Patent: Sep. 10, 2024

(54) METHOD FOR OBTAINING A PRODUCT MADE OF TITANIUM ALLOY OR A TITANIUM-ALUMINIUM INTERMETALLIC COMPOUND

(71) Applicant: SAFRAN, Paris (FR)

(72) Inventor: Pierre Jean Sallot, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/254,966

(22) PCT Filed: Dec. 2, 2021

(86) PCT No.: PCT/FR2021/052182
§ 371 (c)(1),
(2) Date: May 30, 2023

(87) PCT Pub. No.: WO2022/117964
PCT Pub. Date: Jun. 9, 2022

(65) Prior Publication Data
US 2024/0091850 A1 Mar. 21, 2024

(30) Foreign Application Priority Data
Dec. 3, 2020 (FR) ...................... 2012625

(51) Int. Cl.
*B22D 11/112* (2006.01)
*B22D 11/00* (2006.01)
(Continued)

(52) U.S. Cl.
CPC .......... *B22D 41/015* (2013.01); *B22D 11/001* (2013.01); *B22D 11/041* (2013.01);
(Continued)

(58) Field of Classification Search
CPC ... B22D 11/001; B22D 11/041; B22D 11/055; B22D 11/112; B22D 11/141; B22D 21/005; B22D 27/04
See application file for complete search history.

(56) References Cited

U.S. PATENT DOCUMENTS 3,650,311 A   3/1972  Fritsche
7,322,397 B2 * 1/2008  Jacques .............. B22D 11/1213
                                                164/268

(Continued)

FOREIGN PATENT DOCUMENTS

EP    2679321 A1 *  1/2014  ............. B22D 11/00
JP   H03052747 A    3/1991
JP    07188796 A *  7/1995

OTHER PUBLICATIONS

International Search Report mailed Mar. 29, 2022, issued in corresponding International Application No. PCT/FR2021/052182, filed Dec. 2, 2021, 7 pages.

*Primary Examiner* — Kevin E Yoon
(74) *Attorney, Agent, or Firm* — Christensen O'Connor Johnson Kindness PLLC (57) ABSTRACT

A method for obtaining a product made of titanium alloy or a titanium-aluminum intermetallic compound by plasma torch melting, the alloy having an oriented structure, the method including heating the molten alloy surface in a casting ring with a plasma torch; cooling a cold zone of the casting ring over a length L1, the cooling forming a semi-solid crown of alloy; heating a hot zone of the casting ring over a length L2, thereby forming a solidification front, the flatness of which relative to a plane perpendicular to a drawing direction is less than 10°; and drawing the solidified alloy at a speed of more than $10^{-4}$ m/s in the drawing direction. The present disclosure also relates to a plant having one or more devices for implementing the method.

7 Claims, 6 Drawing Sheets

(51) Int. Cl.
- *B22D 11/041* (2006.01)
- *B22D 11/14* (2006.01)
- *B22D 21/00* (2006.01)
- *B22D 27/04* (2006.01)
- *B22D 41/015* (2006.01)
- *C22C 1/02* (2006.01)
- *C22C 14/00* (2006.01)

(52) U.S. Cl.
CPC .......... *B22D 11/112* (2013.01); *B22D 11/141* (2013.01); *B22D 21/005* (2013.01); *B22D 27/04* (2013.01); *C22C 1/02* (2013.01); *C22C 14/00* (2013.01)

(56) References Cited

U.S. PATENT DOCUMENTS

| | | |
|---|---|---|
| 2008/0035298 A1 | 2/2008 | Yu et al. |
| 2009/0008059 A1 | 1/2009 | Jacques et al. |
| 2017/0197243 A1* | 7/2017 | Kurosawa ............ B22D 11/041 |

* cited by examiner

METHOD FOR OBTAINING A PRODUCT MADE OF TITANIUM ALLOY OR A TITANIUM-ALUMINIUM INTERMETALLIC COMPOUND

TECHNICAL FIELD

The present invention relates to the field of methods for making alloys, in particular aeronautical alloys like titanium-based alloys or TiAl intermetallics, as well as plants for implementing these methods.

PRIOR ART

There are several processes used for making alloys, in particular with regards to aeronautical alloys like nickel-based alloys, titanium-based alloys or TiAl intermetallic alloys. The latter are made primarily from virgin raw materials compacted in the form of a cylindrical electrode and then melted in the vacuum arc remelting process (more commonly known as VAR), or by recycling offcuts for which the vacuum induction melting method (more commonly known as VIM) is most often used (in a cold crucible or in a hot crucible).

However, as regards to intermetallic alloys containing about 50% aluminum atoms, these methods have the drawback of being carried out under vacuum. Given the vapor pressure of aluminum in a molten titanium bath, large amounts of aluminum element can evaporate during melting, which makes control of the overall alloy elementary composition difficult.

Figure 1:
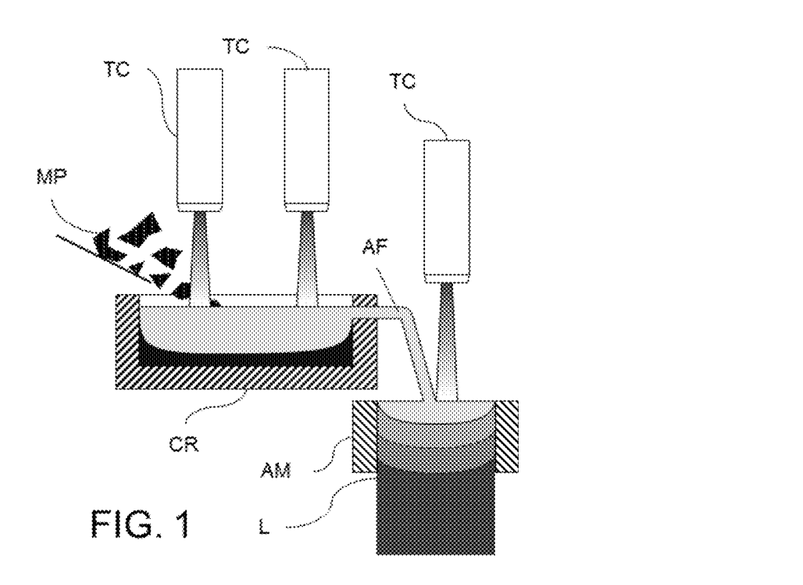
FIG. 1 shows a diagram illustrating the PAM-CHR method of the prior art.

An alternative method exists and is still being developed for these alloys, but also for titanium-based alloys in general, which is plasma torch melting in a cold crucible (or PAM-CHR, standing for Plasma Arc Melting/Cold Hearth Refining). This method is illustrated in FIG. 1. This method uses helium and/or argon at atmospheric pressure to feed plasma torches. The neutral gas pressure enables limitation of evaporation of the reactive elements, including aluminum, by 3 to 5 orders of magnitude, making it possible to melt such alloys. More particularly, in this method, the raw material MP (which may be in the form of offcuts, briquettes, bars, or a sponge/master alloy mixture) is pushed into a cold crucible CR and melted by one or more plasma torches TC sweeping the surface of the crucible. As melting progresses, the liquid metal AF moves towards a refining area where the temperature is stabilized and some impurities are eliminated. Then, the liquid metal AF flows discontinuously into a cooled casting ring AM made of copper and from which an ingot L is extracted step-by-step.

From an economic perspective, the PAM-CHR method is the least expensive one of titanium re-melting processes (20 to 60% reduction in costs): it also enables easy recycling of offcuts without having to compact them beforehand; and the use of plasma torches focusing the energy where it is needed enables making the process more energy efficient. In some cases, the material health of the produced ingots is such that it is possible to use this material without any additional thermomechanical conversion treatment and to cut parts directly from the mass thereof.

Nevertheless, for some alloys, as is the case for titanium-based alloys and TiAl intermetallic alloys, the microstructure, and in particular its orientation, can directly influence the mechanical properties of the produced alloy. Thus, microstructure control during solidification of these alloys is a major area for improvement. In the case of PAM-CHR, solidification essentially occurs at the casting ring, which today is made of cooled copper.

The PAM-CHR method comes close to the well-known continuous casting technique of the prior art. Yet, there are solutions making it possible to orient the microstructure during solidification for these continuous casting processes. Most solutions are based on the use of two areas which are, in that order, a hot area where the metal is maintained liquid and a cold area where it is cooled down.

However, these solutions cannot be directly applied to the PAM-CHR method. Indeed, the latter has the distinctive feature regarding the casting ring of comprising heating the liquid metal surface, above the casting ring, using a plasma torch, quite often centered with respect to the casting ring. This configuration causes a heat flux at the surface of the liquid bath which can be modeled, for casting a cylindrical ingot with a circular base, according to equation Math. 1 where $\eta$ is the efficiency of the torch, Q its power (W), $\sigma$ the radius of action of the torch (m) and r the distance from the center of the ingot (m):

$$q_{PAM} = \frac{3}{\pi \times \sigma^2} \times \eta \times Q \times \exp\left(-3 \times \frac{r^2}{\sigma^2}\right) \quad \text{[Math. 1]}$$

Figure 2:
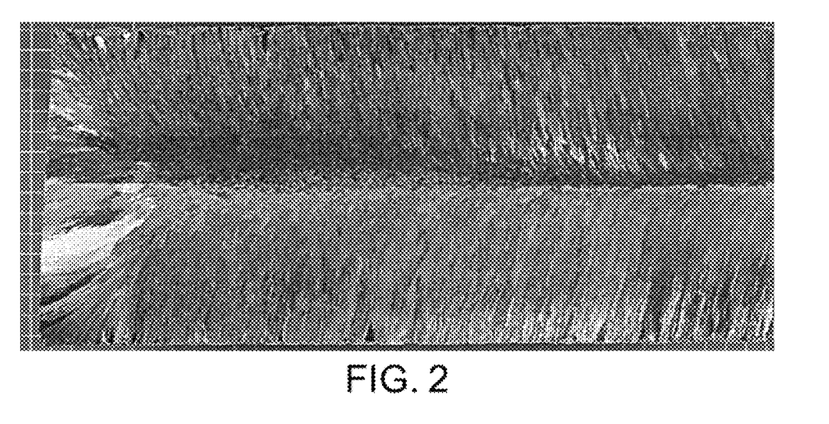
FIG. 2 represents a section of a drawn ingot obtained through the method of FIG. 1.
Figure 3:
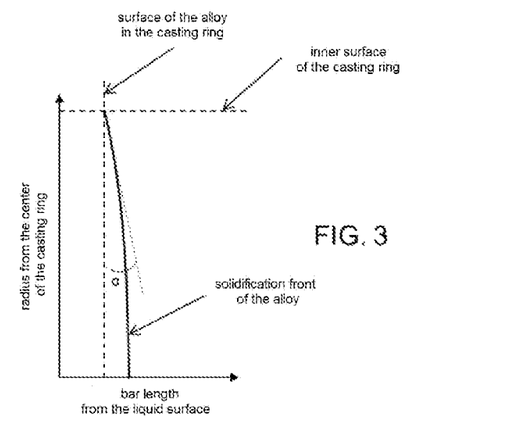
FIG. 3 schematically shows an example of a solidification front obtained using the method of FIG. 1.

Such heat flux distribution, associated with a drawing speed of the ingot, is not compatible with an oriented solidification because it causes a non-planar solidification front at the casting ring; deeper at the center than at the edges of the ring. FIG. 2 is a section of an ingot cast using such process. FIG. 3 schematically shows an example of a solidification front obtained using this type of method.

The authors of document FR 3090430 attempt to address these inhomogeneities. In this document, mixing of the liquid alloy in the casting ring is carried out by electromagnetic induction, thereby making it possible to homogenize and optimize the macrostructure of the obtained ingot and facilitate transformations of this ingot to obtain a final part. Moreover, the method described in this document makes it possible in particular to reduce dispersions in the (for example mechanical) properties of the obtained ingot.

However, the method described in this document has the drawback of not being able to orient the microstructure. Indeed, the agitation created inside the liquid alloy does not make it possible to control the solidification front; the induction generating an agitation which is detrimental to an oriented growth of dendrites.

SUMMARY

This disclosure improves the situation.

To this aim, the present invention provides a method for obtaining a product made of a titanium alloy or a TiAl intermetallic compound by plasma torch melting, the alloy having an oriented structure, the method comprising:
  plasma torch heating of the surface of the molten alloy at a casting ring;
  cooling a cold area at the casting ring just below the surface of the molten alloy, over a length L1, thereby forming a semi-solid crown of alloy;
  heating, downstream of the cold area, a hot area over a length L2, thereby allowing controlling a solidification front of the alloy at the outlet of the hot area and with a flatness with respect to a plane perpendicular to a drawing direction is less than 10°; and drawing the solidified alloy at a speed higher than 10⁰ m/s along the drawing direction.

In the present disclosure, an alloy is so-called "titanium alloy" or "titanium-based alloy" when it comprises at least 50% by weight of titanium.

Thanks to the formation of a solidification front perpendicular to the drawing direction of the alloy ingot, it is possible to obtain an oriented structure. This makes it possible to improve the, in particular the mechanical, performances of the alloy in question so that parts can be machined directly in the ingot without the need for preliminary treatment.

Optional and non-limiting features are disclosed herein.

The cold area may be maintained at a temperature comprised between 0 and 50° C., preferably between 10 and 40° C., preferably between 25 and 35° C., preferably between 20 and 30° C., preferably 25° C.

The hot area may be maintained at a temperature comprised between $T_f \times 0.8$ and $T_f \times 1.25$, preferably between $T_f \times 0.85$ and $T_f \times 1.20$, preferably between $T_f \times 0.9$ and $T_f \times 1.15$, preferably between $T_f$ and $T_f \times 1.10$, preferably $T_f \times 1.05$. $T_f$ herein is the melting point of the considered alloy.

Length L1 may be comprised between 0.065 and 0.09 m.

Length L2 may be comprised between 0.17 and 0.3 m.

The L2/L1 ratio may be comprised between 4 and 6, preferably 5.

The selection of the power of the plasma torch may depend on the drawing speed and governed by the control law represented by following equation Math. 2 where V is the drawing speed (m/s), S is the section of the drawn ingot (m²), R the radius of the drawn ingot (m), η the efficiency of the plasma torch, Q the power of the plasma torch (W), σ the radius of action of the plasma torch (m), P the perimeter of the casting ring (m), L the total length of the casting ring (m), ρ the volumetric mass of the cast alloy (kg·m⁻³), h the exchange coefficient of the casting ring (W·m⁻²·° C.⁻¹), $L_M$ the specific latent heat of fusion of the cast alloy (J·kg⁻¹), $C_p$ the specific heat (J·kg⁻¹·° C.⁻¹), $\Delta T_2$ the thermal gradient between the inlet and the outlet of the ring (° C.) and where $\Delta T_1$ is the thermal gradient between the metal temperature at the hot area and its preheating temperature:

$$V = \frac{P*h*L*\Delta T_1 - \eta*Q*\left(1 - \exp\left(-3*\frac{R^2}{\sigma^2}\right)\right)}{\rho*S*(C_p*\Delta T_2 + L_M)}. \quad [\text{Math. 2}]$$

In equation Math. 2 above, $\Delta T_1$ may be comprised between 10° C. and 250° C., and $\Delta T_2$ may be comprised between 200° C. and 900° C. in particular for a TiAl intermetallic alloy.

The method may further comprise cooling a second cold area over a length L3, downstream of the hot area. In which case, length L3 may be larger than 0.03 m.

The present invention also relates to a plant for obtaining a product made of a titanium alloy or of a titanium intermetallic compound by plasma torch melting, the alloy having an oriented structure, the plant comprising:
a plasma torch;
a casting ring having an alloy inlet end and an alloy outlet end, the inlet end being disposed under the plasma torch;
a cooling device placed around the casting ring proximate to the inlet end; and
a heater placed around the casting ring between the cooling device and the alloy outlet end.

BRIEF DESCRIPTION OF THE DRAWINGS

Other features, details and advantages will appear upon reading the detailed description hereinafter, and upon analyzing the appended drawings, wherein:

In FIGS. 6 to 9 hereinabove, the lines are isopleth lines joining points with the same angular value. The continuous line indicates the limit between the domain where angle α is larger than 10° and the domain where it is smaller than 10°. The darker the pattern, the larger the angle.

DISCLOSURE

The method for obtaining a product made of a titanium alloy or a TiAl intermetallic compound by plasma torch melting according to the invention will be described in more detail below with reference to FIGS. 4 to 9. The alloy obtained through this method has an oriented structure. When several intervals of values are given for a given feature, the intervals within two disclosed endpoints also form part of the present invention; any disclosed lower endpoint may be selected as the lower or upper endpoint of an interval and any disclosed upper endpoint may be selected as the lower or upper endpoint of that interval, the only limitation being that the value selected as the lower endpoint should be lower than the value selected as the upper endpoint.

Figure 4:
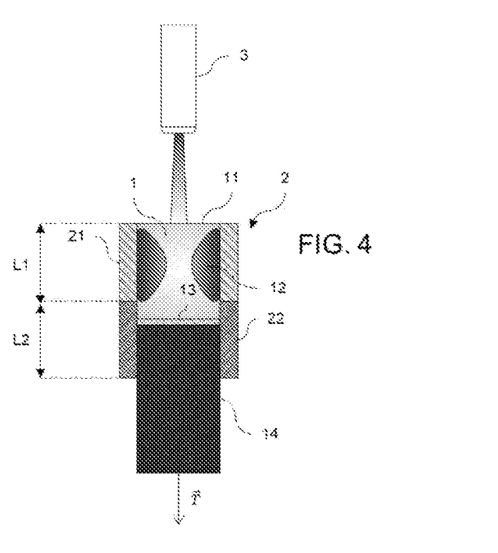
FIG. 4 shows a diagram illustrating an example of a method according to the invention, the diagram is limited to the portion differing from the prior art. In the method of FIG. 4, a hot area downstream of a cold area is used in the casting ring.

This method comprises heating by plasma torch 3 the surface 11 of the molten alloy 1 at a casting ring 2; cooling a cold area 21 at the casting ring 2 just below the surface 11 of the molten alloy 1, over a length L1; heating, downstream of the cold area 21, a hot area 22 over a length L2; and drawing the solidified alloy at a speed higher than $10^{-4}$ m/s along the drawing direction $\vec{T}$.

The selection of the power of the plasma torch 3 during heating of the surface 11 of the molten alloy 1 may depend on the drawing speed. Conversely, the selection of the drawing speed may depend on the power of the plasma torch 3. In particular, this selection may be governed by the control law represented by equation Math. 2 hereinabove. A person skilled in the art would know how to invert these expressions to express the required power as a function of the drawing speed.

These equations are particularly adapted to a circular section of the drawn ingot. However, they remain relevant for ingots having sections with different shapes, in particular square, triangular or rectangular. Indeed, they make a good approximation of the control laws for ingots having other sectional shapes. Moreover, it should be noted that the more the drawing speed increases, the lower the power of the plasma torch enabling maintenance of the molten alloy will be. This is all the more true as the section of the produced ingot is large.

Preferably, the power of the plasma torch is comprised between 5 and 400 kW.

Figure 10:
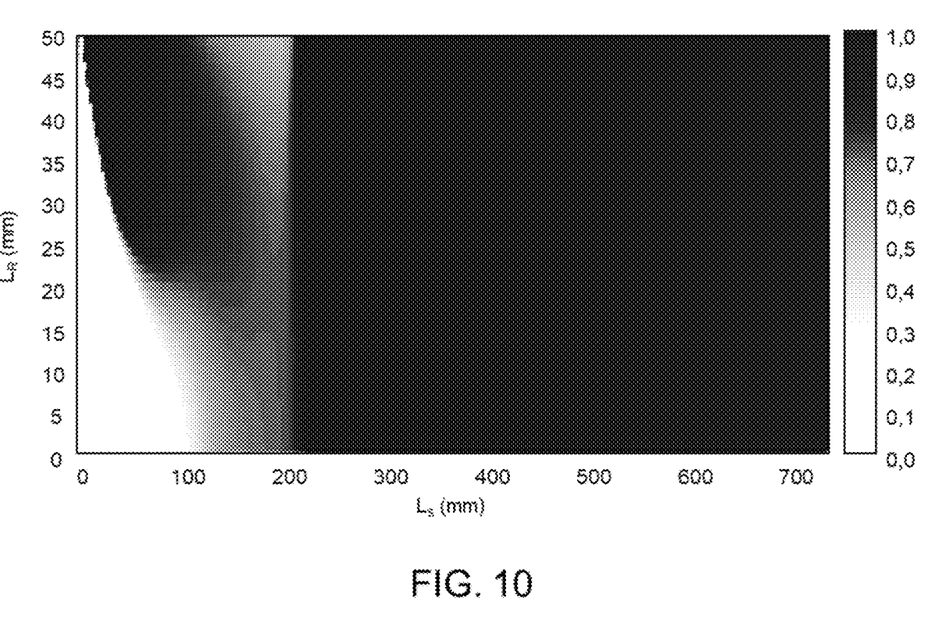
FIG. 10 schematically shows the state of the alloy in the casting ring forming a solidification crown at the periphery in grayscale (in white—0.0—if the alloy is completely liquid, in black—1.0—if the alloy is completely solid); the abscissa indicating the distance ($L_S$) from the surface of the molten alloy and the ordinate the distance ($L_R$) from the center of the longitudinal axis of the casting ring and the ingot.

Cooling the cold area 21 makes it possible to locally solidify the alloy 1 and produces a semi-solid alloy crown 12 (shown in FIG. 10). This semi-solid crown 12 shields the inhomogeneous heat flux of the plasma torch 2 enabling a controlled heating downstream of this area. The cold area 21 may be maintained at a temperature comprised between 0 and 50° C., preferably between 10 and 40° C., preferably between 25 and 35° C., preferably between 20 and 30° C., preferably 25° C.

Cooling the cold area 21 may be carried out through an active cooling system. An exemplary active cooling system may comprise a cooling circuit comprising a heat exchange area with a heat-transfer fluid; the heat exchange area being placed at the cold area of the casting ring 2. This exchange area may be made, for example, from winding a copper tube in which thermostatically-controlled water flows, in contact with the portion of the casting ring 2 to be cooled down. This may also be done by forming a cavity in the cold area of the casting ring 2 in order to make a fluid flow therein enabling calory evacuation.

The use of the hot area 22 downstream of the cold area 21 makes it possible to liquefy the alloy 1 again, this time in a controlled manner Thus, a semi-solid pocket (alloy in a pasty form) forms under the crown 12, the temperature and position of which can be easily controlled; which enables the control of the solidification front 13. Thus, it is possible to control the flatness of the solid/liquid interface of the alloy when the latter cools down thanks to this combination of a cold area 21 and a hot area 22 downstream of the cold area 21. Hence, it is possible to control angle α of the solidification front 23 of the alloy forms in the hot area with respect to a plane perpendicular to the drawing direction T so that it remains lower than 10°. The angle is measured at the inner surface of the casting ring 2 in a plane comprising the longitudinal axis of the drawn ingot which is collinear with the drawing direction; this angle is that one between a line resulting from the intersection between the considered plane and the plane perpendicular to the drawing axis and a line tangent to the curve resulting from the intersection between the considered plane and the solidification front considered at the inner surface of the casting ring 2. Moreover, the alloy being in a pasty and non-liquid form, this makes it possible to limit the erosion of the casting ring by the molten alloy.

The temperature of the hot area 22 has a direct impact on the flatness of the solidification front 13. Thus, the hot area 22 is preferably maintained at a temperature comprised between $T_f \times 0.8$ et $T_f \times 1.25$, preferably between $T_f \times 0.85$ et $T_f \times 1.20$, preferably between $T_f \times 0.9$ et $T_f \times 1.15$, preferably between $T_f$ et $T_f \times 1.10$, preferably $T_f \times 1.05$. $T_f$ refers to the melting point of the alloy. These intervals are valid for all geometries of the drawn ingot.

Heating the hot area may be carried out through induction heating, resistive heating or radiative heating. In the case of induction heating, the hot area of the casting ring must be made of a ferromagnetic material and sized so as to prevent transmission of the induction force to the alloy. Indeed, in such case, the alloy would then be set in motion by the induction force, disturbing solidification thereof into an oriented structure.

Length L1 of the cold area 21 may be comprised between 0.065 and 0.09 m. Length L2 of the hot area 22 may be comprised between 0.17 and 0.3 m.

Figure 6:
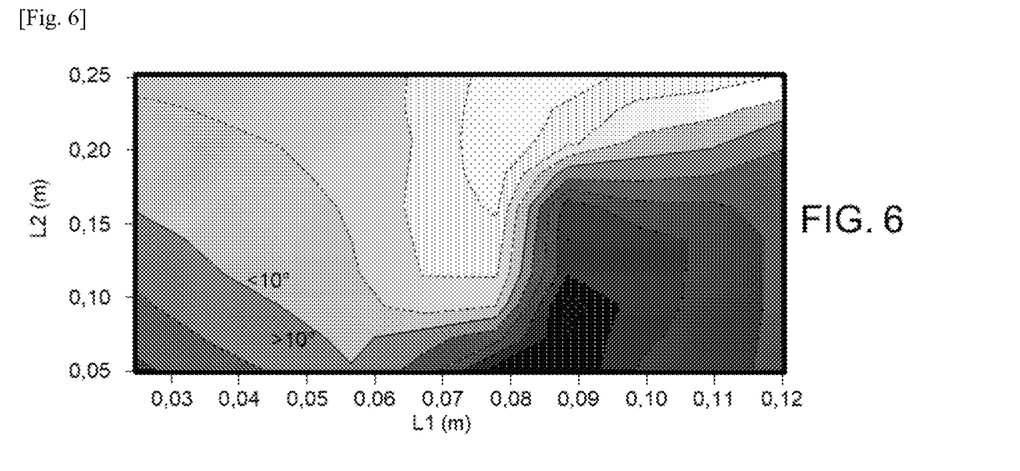
FIG. 6 shows angle α formed by the solidification front with respect to a plane perpendicular to the drawing direction as a function of the length of the cold area L1 and the length of the hot area L2 at a drawing speed of 0.00015 m/s.
Figure 7:
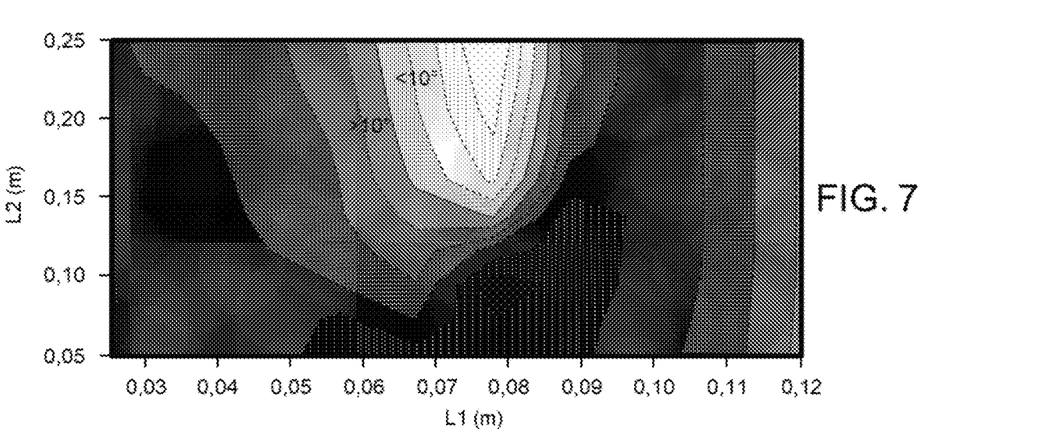
FIG. 7 shows angle α formed by the solidification front with respect to a plane perpendicular to the drawing direction as a function of the length of the cold area L1 and the length of the hot area L2 at a drawing speed of 0.0003 m/s.
Figure 8:
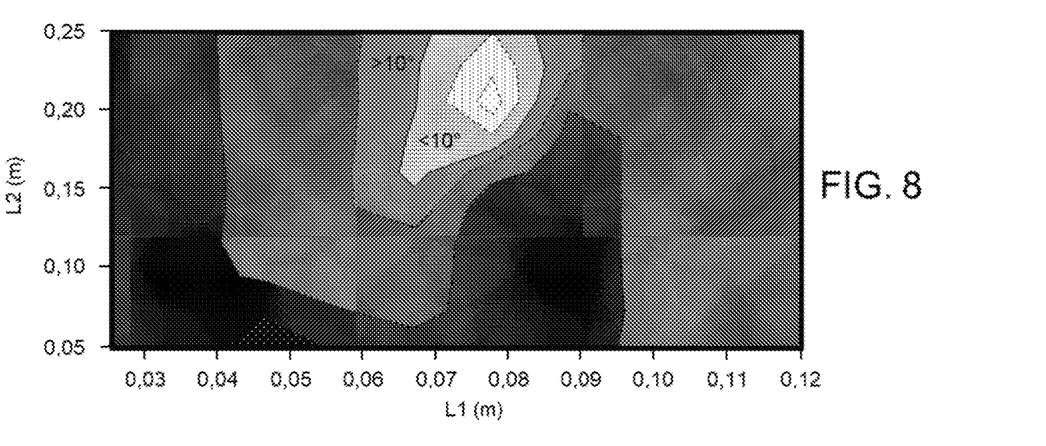
FIG. 8 shows angle α formed by the solidification front with respect to a plane perpendicular to the drawing direction as a function of the length of the cold area L1 and the length of the hot area L2 at a drawing speed of 0.00045 m/s.

The size of lengths L1 and L2 has been determined through simulations enabling assessment of the solidification front flatness. Some results obtained for a section of the drawn circular ingot of 78 cm 2 are shown in FIGS. 6 to 8. These figures show the impact of the selection of lengths L1 and L2 on the solidification front flatness at different drawing speeds, respectively 0.00015 m/s, 0.0003 m/s and 0.00045 m/s. The flatter the solidification front, the lighter the corresponding domain. It can be noticed that the higher the drawing speed is, the more the domain corresponding to a solidification front forming an angle of less than 10° with respect to a plane perpendicular to the drawing direction is limited. The length intervals have been determined in order to have a good trade-off between the flatness of the solidification front and the drawing speed range over which the method is applicable.

The L2/L1 ratio between the length of the hot area 22 and the length of the cold area 21 may be comprised between 4 and 6, preferably 5. Under these circumstances, the ratio between the thermal gradient at the solid/liquid interface of the alloy (pasty area) and the progression speed of the solidification front G/V is higher than $10^6$ Ks/m². These ratio values correspond to a domain for which the oriented solidification is facilitated.

Figure 5:
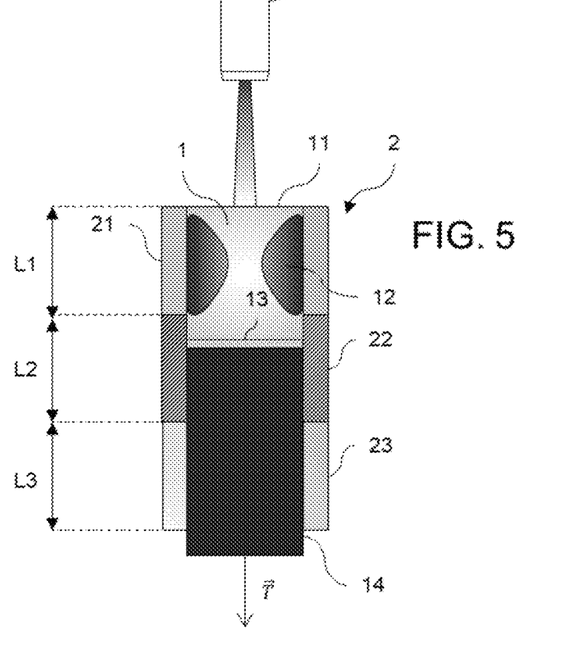
FIG. 5 shows a diagram illustrating another example of a method according to the invention. Like FIG. 4, the diagram is limited to the portion differing from the prior art. The method of FIG. 5 differs from that of FIG. 4 by the addition of another cold area downstream of the hot area.
Figure 9:
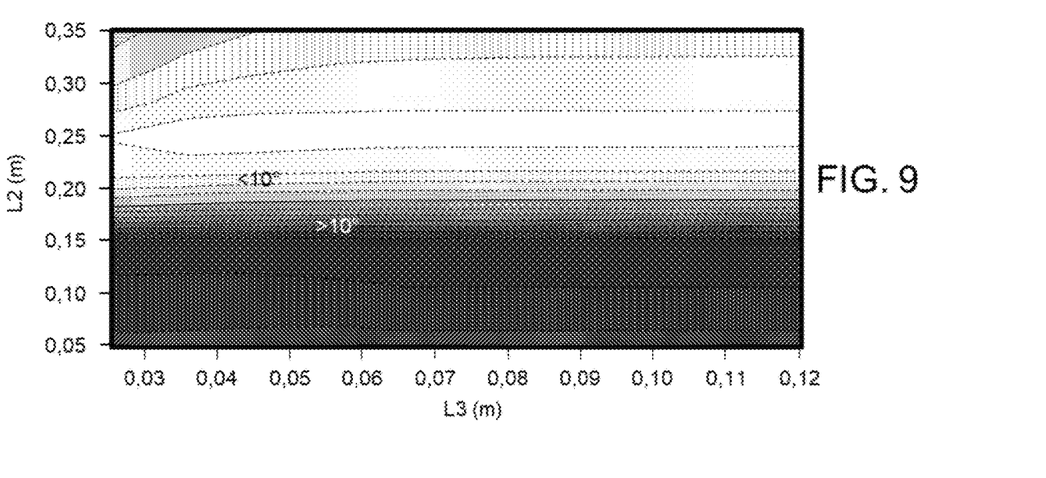
FIG. 9 shows angle α formed by the solidification front with respect to a plane perpendicular to the drawing direction as a function of the length of the hot area L2 and the length of the cold area L3 at a drawing speed of 0.0003 m/s, for a cold area length L1 of about 0.077 m.

In order to further increase the G/V ratio, the method may further comprise cooling a second cold area 23 over a length L3, downstream of the hot area 22. Such a method is illustrated in FIG. 5, where besides the elements already present in FIG. 4, a second cold area 23 is added downstream of the hot area 22. In such case, length L3 may be larger than 0.03 m. This limit has been determined by simulation. FIG. 9 shows the result of one of these simulations for a drawing speed of 0.0003 m/s. It should be noticed that it is necessary to go beyond 0.03 m for L3 to find an increased domain of angles larger than 10°. On the other hand, beyond 0.06 m, this domain does not grow any further.

Upstream of the above-described steps, the method may comprise supplying raw material (in particular in the form of offcuts, briquettes, bars, a sponge/master alloy mixture, etc.), heating the raw material (for example by plasma torch, electric arcs, induction, electron bombardment, etc.) thereby melting the raw material into a crude molten alloy, refining the crude molten alloy (comprising for example stabilizing the temperature of the alloy and removing impurities), and casting the refined molten alloy into the casting ring 2. These steps are known from the prior art and do not constitute the core of the present invention.

Figure 11:
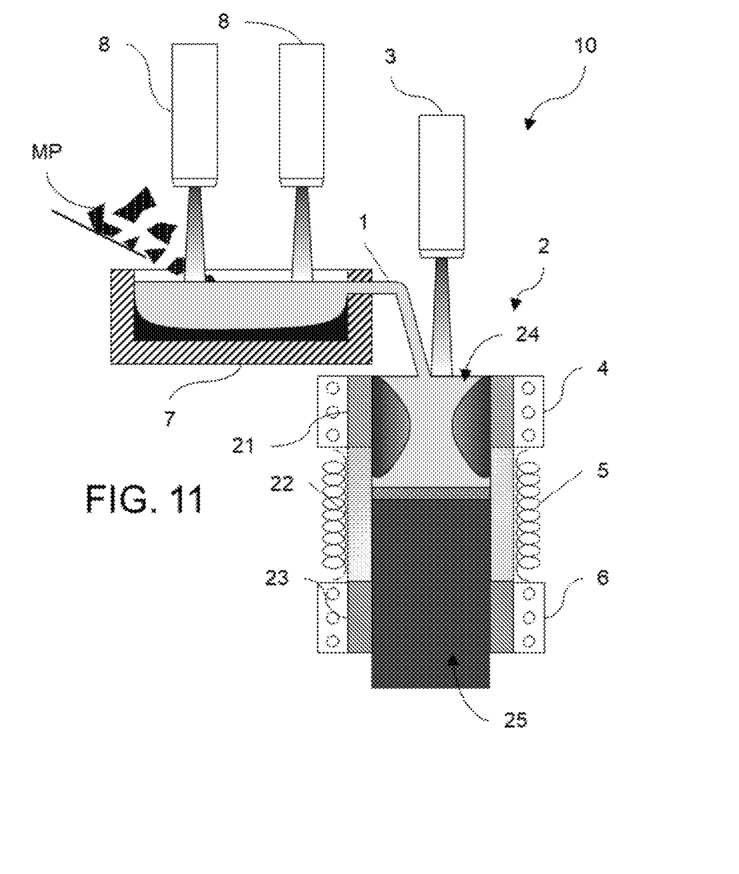
FIG. 11 shows a plant for implementing the method according to the invention.

A plant for obtaining a titanium alloy or titanium intermetallic product by plasma torch melting, the alloy having an oriented structure, according to the invention is described hereinafter with reference to FIG. 11. The plant 10 comprises a plasma torch 3, a casting ring 2, a cooling device 4 and a heater 5.

The casting ring 2 has an alloy inlet end 24 and an alloy outlet end 25, the inlet end 24 being placed under the plasma torch 3. The casting ring 2 comprises a cold area 21 placed under the inlet end 24 and a hot area 22 placed downstream of the cold area 21, in particular in contact with the latter. The casting ring 2 may further comprise a second cold area 23 downstream of the hot area 22 above the outlet end 25.

At least one portion of the cooling device 4 is placed around the cold area 21 of the casting ring 2. This cooling device may comprise a cooling circuit comprising a heat exchanger placed around the cold area 21 of the casting ring 2. Alternatively, this device may be composed of a winding of a copper tube enabling circulation of the cooling fluid.

A heater 5 is placed around the hot area 22 of the casting ring 2 between the cooling device 4 and the outlet end 25. This device may be formed by a magnetic inductor allowing coupling with the constituent material of the hot area of the casting ring.

The plant may also comprise a control for controlling the power of the plasma torch 3 according to the drawing speed. Alternatively, the control may be a control of the drawing speed according to the plasma torch 3. These controls may be carried out according to equation Math. 2 above.

In the case where the casting ring 2 comprises a second cold area 23, this area may be passively cooled by heat exchange with ambient air. Alternatively, a second cooling device 6 may be provided, a portion of which is placed around the second cold area 23. This second cooling device 6 may be selected amongst the same options as for the cooling device 4.

The plant 10 may also comprise a cold crucible 7 for receiving raw material and placed above the casting ring 2. The plant 10 may further comprise a heater 8 for heating the raw material until it is melt down. Heating may be plasma torch heating, electric arcs heating, induction heating, electron bombardment heating, etc. Heating may also be carried out by electron-beam melting (electron beam melting, or EBM) through EB torches.

The plant may comprise sensors for controlling the drawing speed. The plant may also comprise sensors for controlling the temperature of the cooling device 4, for example of the heat-transfer fluid.

The invention claimed is:

1. A method for obtaining a product made of a titanium alloy or a TiAl intermetallic compound by plasma torch melting, the alloy having an oriented structure, the method comprising:
   heating, with a plasma torch, a molten alloy or compound surface at a casting ring;
   cooling a cold area at the casting ring below the molten alloy or compound surface, over a length L1 at a temperature comprised between 0 and 50° C., thereby forming a semi-solid alloy or compound crown;
   heating, downstream of the cold area, a hot area over a length L2 at a temperature between $T_f \times 0.8$ and $T_f \times 1.25$, $T_f$ representing the melting temperature of the molten alloy or compound, thereby enabling control of an alloy or compound solidification front at an outlet of the hot area, the alloy or compound solidification front having a flatness with respect to a plane perpendicular to a drawing direction of less than 10°; and
   drawing the solidified alloy or compound at a drawing speed higher than $10^{-4}$ m/s along the drawing direction.

2. The method of claim 1, wherein the length L1 is between 0.065 m and 0.09 m.

3. The method of claim 1, wherein the length L2 is between 0.17 m and 0.3 m.

4. The method of claim 1, wherein a [L2/L1] ratio of the length L2 to the length L1 is between 4 and 6.

5. The method of claim 1, further comprising selecting a power of the plasma torch based on the drawing speed governed by a control law represented by:

$$V = \frac{P * h * L * \Delta T_1 - \eta * Q * \left(1 - exp\left(-3 * \frac{R^2}{\sigma^2}\right)\right)}{\rho * S * (C_p * \Delta T_2 + L_M)}$$

wherein V is the drawing speed (m/s), S is the section of the drawn ingot (m²), R the radius of the drawn ingot (m), η the efficiency of the plasma torch, Q the power of the plasma torch (W), σ the radius of action of the plasma torch (m), P the perimeter of the casting ring (m), L the total length of the casting ring (m), ρ the volumetric mass of the cast alloy (kg·m⁻³), h the exchange coefficient of the casting ring (W·m⁻²·° C.⁻¹), $C_p$ the specific heat (J·kg⁻¹·° C.⁻¹), $L_M$ the specific latent heat of fusion of the cast alloy (J·kg⁻¹), $\Delta T_2$ the thermal gradient between the inlet and the outlet of the ring (° C.), and $\Delta T_1$ is the thermal gradient between the metal temperature at the hot area and its preheating temperature.

6. The method of claim 1, further comprising cooling a second cold area over a length L3 downstream of the hot area.

7. The method of claim 6, wherein the length L3 is larger than 0.03 m.

* * * * *